(12) United States Patent
Audette (10) Patent No.: US 7,430,972 B2
(45) Date of Patent: Oct. 7, 2008

(54) SEED AND FERTILIZER DRILL AND METHOD

(76) Inventor: Patrick Audette, 1512 Saint-Charles St., Saint-Jude (CA) J0H 1P0

( * ) Notice: Subject to any disclaimer, the term of this patent is extended or adjusted under 35 U.S.C. 154(b) by 0 days.

(21) Appl. No.: 11/484,853

(22) Filed: Jul. 12, 2006

(65) Prior Publication Data
US 2007/0113764 A1   May 24, 2007

Related U.S. Application Data

(63) Continuation of application No. PCT/CA2005/000038, filed on Jan. 12, 2005.

(60) Provisional application No. 60/535,517, filed on Jan. 12, 2004.

(51) Int. Cl.
*A01C 7/00* (2006.01)
*A01C 9/00* (2006.01)

(52) U.S. Cl. .................. 111/186; 111/200; 111/900

(58) Field of Classification Search ......... 111/170–176, 111/186–188, 200, 900
See application file for complete search history.

(56) References Cited

U.S. PATENT DOCUMENTS

2,756,662 A   7/1956   Christensen
4,241,674 A   12/1980  Mellinger
4,244,306 A   1/1981   Peterson et al.
4,263,858 A   4/1981   Dreyer
4,265,186 A   5/1981   Nichols
4,450,779 A   5/1984   Bailey
4,653,410 A   3/1987   Typpi
4,785,890 A   11/1988  Martin

*Primary Examiner*—Christopher J. Novosad
(74) *Attorney, Agent, or Firm*—Ogilvy Renault LLP (57) ABSTRACT

A drill (10) adapted to distribute at least one of seeds and solid fertilizer, the drill (10) comprising a support frame (12) supported by at least two rear wheels (16) aft thereof, a main reservoir (20) installed on a rear portion (12b) of the support frame (12), the main reservoir (20) forming a receptacle with an at least partially open top to receive the at least one of the seeds and the solid fertilizer, the main reservoir having an outlet in a lower portion thereof a secondary reservoir (32) installed on a front portion of the support frame (12) and having an at least partially open top, a distribution system in communication with the secondary reservoir (32) for distributing the at least one of the seeds and fertilizer; and a conveyor (30) in communication with the outlet in the main reservoir (20) and extending to the secondary reservoir (32) such as to carry the at least one of the seeds and the solid fertilizer from the main reservoir (20) to the secondary reservoir (32), whereby the at least one of the seeds and solid fertilizer travels from the main reservoir (20) to the secondary reservoir (32) via the conveyor (30), and is distributed from the secondary reservoir (32) through the distribution system (37).

18 Claims, 8 Drawing Sheets

SEED AND FERTILIZER DRILL AND METHOD

RELATED APPLICATION(S)

This application is a continuation of International Patent Application No. PCT/CA2005/000038 filed on Jan. 12, 2005, which claims benefit of U.S. Provisional Patent Application No. 60/535,517 filed on Jan. 12, 2004 which is herein incorporated by reference.

BACKGROUND OF THE INVENTION

The present invention relates to seed planting apparatus and fertilizer drills.

More particularly, the present invention relates to a combined seed and fertilizer drill.

Traditional seed planting apparatus generally have a drill adapted to be pinned to a tractor, wherein the drill has a main frame supporting a series of seed planting units located behind a set of rear wheels and extending at a width larger than a distance between the rear wheels. The planting units can generally be elevated in order to reduce the ground width of the apparatus, allowing the performance of a tighter turn. However, with this configuration, the weight of the elevated planting units acts as a lever arm with respect to the rear wheels and produces an upward force on the tractor which reduces traction of the tractor wheels and induces stress concentrations on the main frame.

U.S. Pat. No. 4,450,779, issued May 29, 1984 to Bailey, shows a seed drill having a main reservoir and seed planting equipment located in front of rear wheels. However, the rear wheels are located at outer lateral ends of the seed planting equipment. The drill therefore has a constant and large ground width, which prevents the performance of tight turns and is impractical in a case where the seed drill needs to travel on a public road.

U.S. Pat. No. 4,653,410 issued Mar. 31, 1987 to Typpi, shows a seed planter with small hoppers located in front of rear wheels. The reduced width of this seed planter facilitates public road travel. However, this reduced width as well as small seed hoppers makes it impractical for seed planting in large fields.

U.S. Pat. No. 4,263,858, issued Apr. 28, 1981 to Dreyer, provides a drill distributing both seed and fertilizer in front of rear wheels. However, some fertilizers need to be disposed in separate furrows from the seeds because these fertilizers will burn the seeds on contact. No provisions are made in this drill to avoid such burning since both seeds and fertilizers are distributed in close proximity. In addition, because gravity is used to distribute the seeds and fertilizers, the reservoirs need to be elevated, which makes it more complicated to fill the reservoirs since they are usually filled from an open top.

It is against this background and the desire to solve the problems of the prior art that the present invention has been developed.

SUMMARY OF INVENTION

It is therefore an aim of the present invention to provide an improved seed and fertilizer drill.

Therefore, in accordance with the present invention, there is provided a drill adapted to distribute at least one of seeds and solid fertilizer, the drill comprising a support frame supported by at least two rear wheels aft thereof, a main reservoir installed on a rear portion of the support frame, the main reservoir forming a receptacle with an at least partially open top to receive the at least one of the seeds and the solid fertilizer, the main reservoir having an outlet in a lower portion thereof, a secondary reservoir smaller than the main reservoir, the secondary reservoir being installed on a front portion of the support frame and having an at least partially open top, a distribution system in communication with the secondary reservoir for distributing the at least one of the seeds and fertilizer, and a conveyor in communication with the outlet in the main reservoir and extending to the at least partially open top of the secondary reservoir such as to carry the at least one of the seeds and the solid fertilizer from the main reservoir to the secondary reservoir through the at least partially open top, whereby the at least one of the seeds and solid fertilizer travels from the main reservoir to the secondary reservoir through the conveyor, and is distributed from the secondary reservoir via the distribution system.

Also in accordance with the present invention, there is provided a drill adapted to distribute at least one of seeds and solid fertilizer, the drill comprising a support frame, a plurality of planter row units extending transversally to an axis of travel of the drill and in a generally regularly spaced apart manner, the planter row units being separated in a first, second a third group, a central member supporting the first group of planter row units, the central member being attached to the main frame in a transverse manner so that the first group of planter row units are in contact with the ground in an operational position, and a first and second outer member respectively supporting the second and third group of the planter row units, the first and second outer member being attached respectively to a first and second end of the central member so that each outer member can rest in a first operational position collinear with the central member with the second and third groups of planter row units in contact with the ground, and in a second position parallel to and over the central member, and in a third position perpendicular to and over the central member.

Further in accordance with the present invention, there is provided a method for distributing at least one of seeds and granular fertilizer, the method comprising the steps of providing a seed and fertilizer drill having a main reservoir located near a rear end thereof, a secondary reservoir smaller than the main reservoir and located near a front end of the drill, a conveyor adapted to transport the at least one of seeds and granular fertilizer from the main reservoir to the secondary reservoir, and a distribution system adapted to distribute the at least one of seeds and granular fertilizer from the secondary reservoir, filling the main reservoir with the at least one of seeds and granular fertilizer, transporting the at least one of seeds and granular fertilizers from the main reservoir to the secondary reservoir through the conveyor, and distributing the at least one of the seeds and granular fertilizers from the secondary reservoir with the distribution system.

Further in accordance with the present invention, there is also provided a method for reducing a width of a seed and fertilizer drill having a support frame and a plurality of planter row units extending in a generally regularly spaced apart manner, the planter row units being separated in a first, second a third group respectively supported by a central member attached to the main frame and first and second outer member respectively attached to a first and a second end of the central member, the method comprising the steps of providing a first operation position where the central member and the first and second outer member extend substantially collinearly in a direction generally perpendicular to a direction of travel of the drill so that the planter row units are in contact with the ground, elevating the first and second outer members in a second position parallel to and over the central member, and rotating the first and second outer members in a third position perpendicular to and over the central member such that the first and second outer members are contained within a width of the central member.

BRIEF DESCRIPTION OF THE DRAWINGS

Having thus generally described the nature of the invention, reference will now be made to the accompanying drawings, showing by way of illustration a preferred embodiment thereof and in which.

DETAILED DESCRIPTION OF THE PREFERRED EMBODIMENTS

Figure 1:
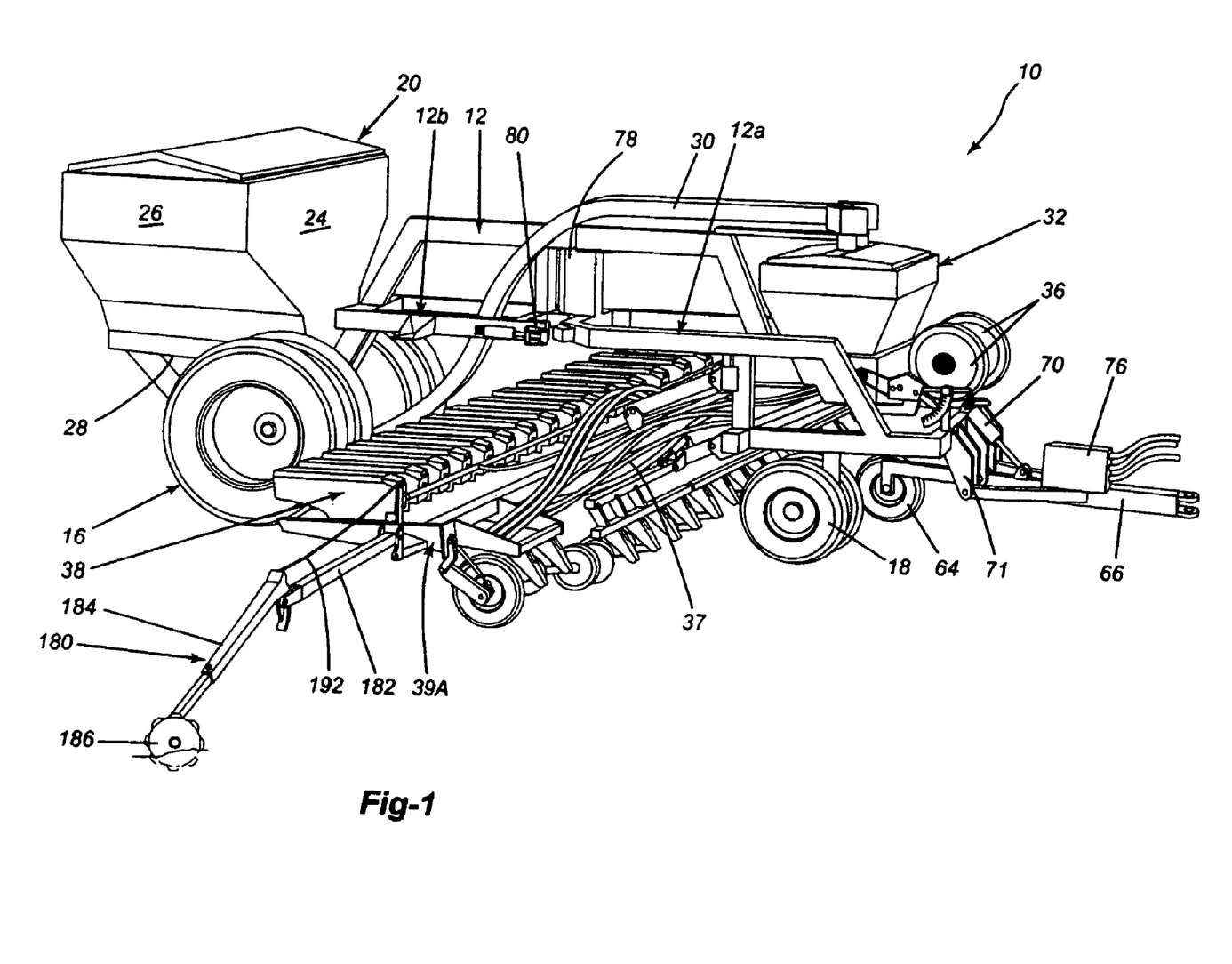
FIG. 1 is a schematic top view of a seed and fertilizer drill according to a preferred embodiment of the present invention.

Referring now to FIG. 1, the seed and fertilizer drill 10 comprises a support frame 12 including two sub-frames, a front sub-frame 12a and a rear sub-frame 12b pivoted together as will be described. The support frame 12 is supported on the ground by a set of rear wheels 16 and by a set of pivoting front wheels 18. In a preferred embodiment the support frame 12 is supported by four rear wheels 16 and two front pivoting wheels 18. It is also contemplated to have four front wheels 18

Figure 2:
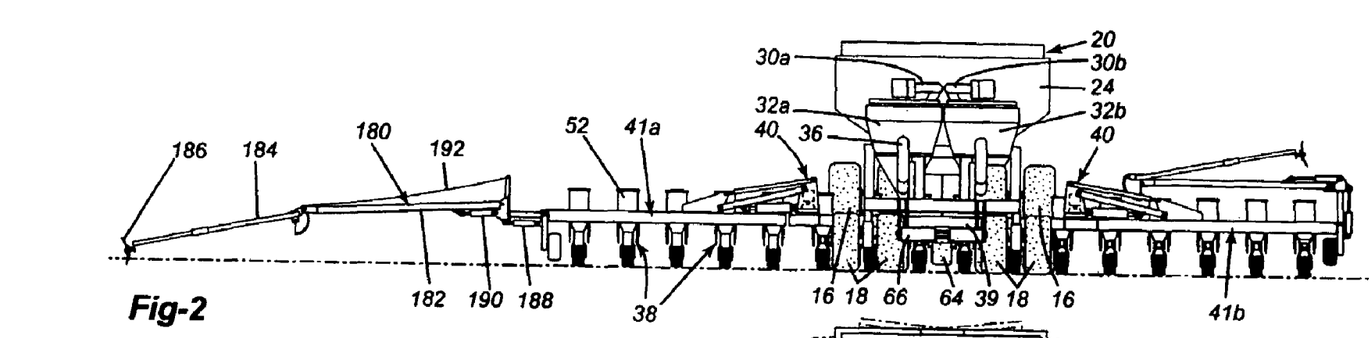
FIG. 2 is a front elevation of the seed and fertilizer drill shown in FIG. 1.

A main reservoir 20 is attached to the support frame 12 substantially over the rear wheels 16. The main reservoir 20 can be used to receive seeds or granular fertilizer and is preferably sized so as to be able to receive approximately eight (8) metric tons of granular fertilizer. The main reservoir 20 includes a rear wall 22, a front wall 24, a pair of side walls 26 joining the rear and front walls 22,24 and a bottom wall 28. The main reservoir 20 has an open top for loading and has an opening (not shown) in the front wall 24 in proximity to the bottom wall 28. As shown in FIG. 2, the rear wall 22 and side walls are preferably inclined toward the front at a bottom end thereof. The reservoir 20 is preferably set as low as possible without having the bottom end 28 interfering with the ground, in order to facilitate loading.

A conveyor 30 extends from inside the reservoir 20 through the opening in the front wall 24 thereof to a secondary reservoir 32. The conveyor 30 picks up the seeds or fertilizer granules in the reservoir 20 and transfers them to the secondary reservoir 32. The conveyor 30 is preferably in the form of an endless flexible screw turning in an appropriately sized tube. It is also considered to use other types of conveyor 30, such as an endless belt with or without ridges to receive the seeds or fertilizer granules.

The secondary reservoir 32 is attached to the front of the support frame 12a. In the present embodiment there are two secondary reservoirs 32a and 32b, smaller than the main reservoir 20 in order to limit a weight force acting on the front of the frame 12. Preferably, the secondary reservoirs 32a,b, are sized so as to have a volume approximately one eighth (⅛) of the volume of the main reservoir 20. The secondary reservoirs 32a,b are in communication with a standard pneumatic distribution system, composed of blowers 36 producing air pressure to push the seeds or granules through an opening in the bottom of the secondary reservoirs 32a,b and through flexible plastic tubes 37 that will deliver the seeds or granules to a desired location. The secondary reservoirs 32a,b are preferably located slightly rearward of the front wheels 18. In the embodiment of the two reservoirs 32a, 32b it is contemplated that the reservoir 20 may be split and two separate conveyors 30a,b would be used (see FIGS. 2, 3).

Figure 3:
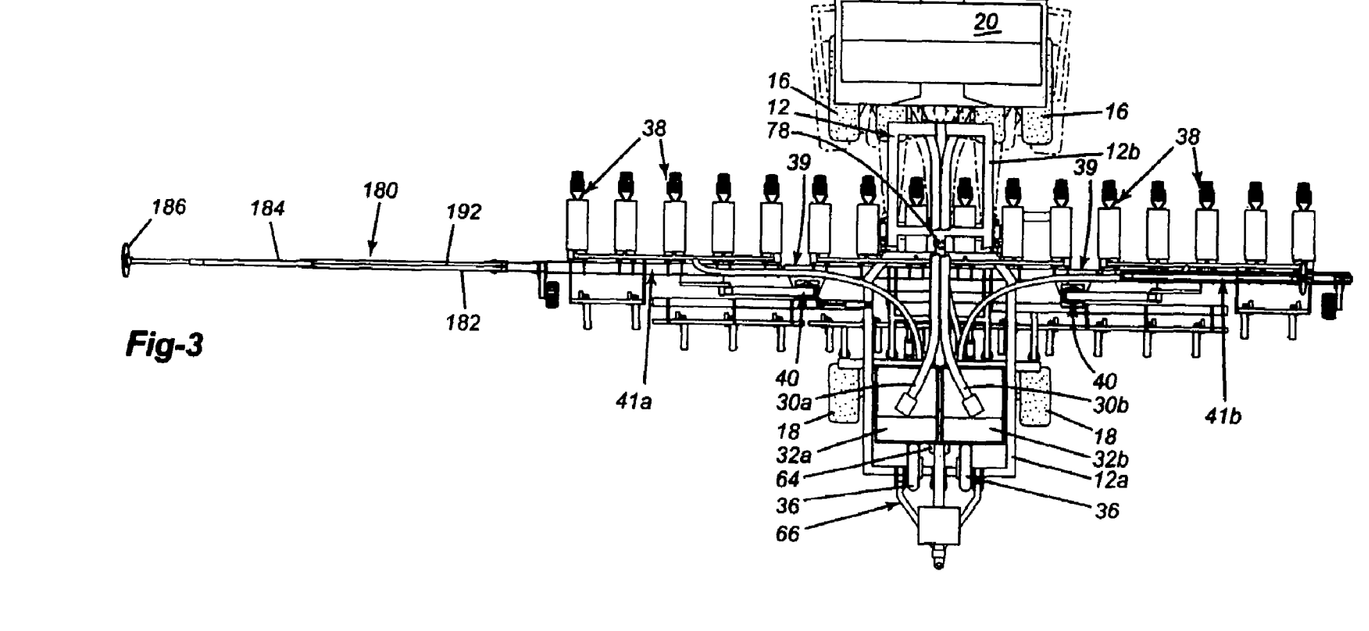
FIG. 3 is a top plan view thereof.
Figure 13:
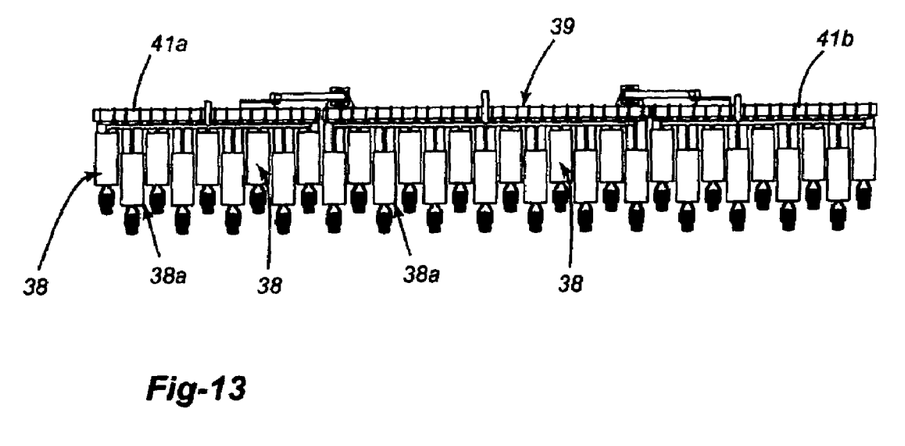
FIG. 13 is a top elevational fragmentary view of a detail of a further embodiment of the feed and fertilizer drill.

As shown in FIGS. 1 to 3, a plurality of standard planting units or planter row units 38 are attached in a regularly spaced apart manner to a primary or central transverse member 39 as well as to two outer transverse members 41a,b located on each side thereof. The transverse members 39, 41a,b extend perpendicularly to the longitudinal axis of frame 12 between the main reservoir 20 and the secondary reservoirs 32a,b forward of the rear wheels 16. The primary transverse member 39 preferably supports six (6) planting units 38 while each outer transverse member 41a,b supports five (5) planting units 38, for a total of sixteen (16) planting units 38. As shown in FIG. 13 it is also considered to provide additional planting units 38a located in each free space between adjacent planting units 38, such as to obtain thirteen (13) planting units on the primary transverse member 39 and nine (9) planting units on each secondary transverse member 41a,b, for a total of thirty-one (31) planting units.

Figure 4:
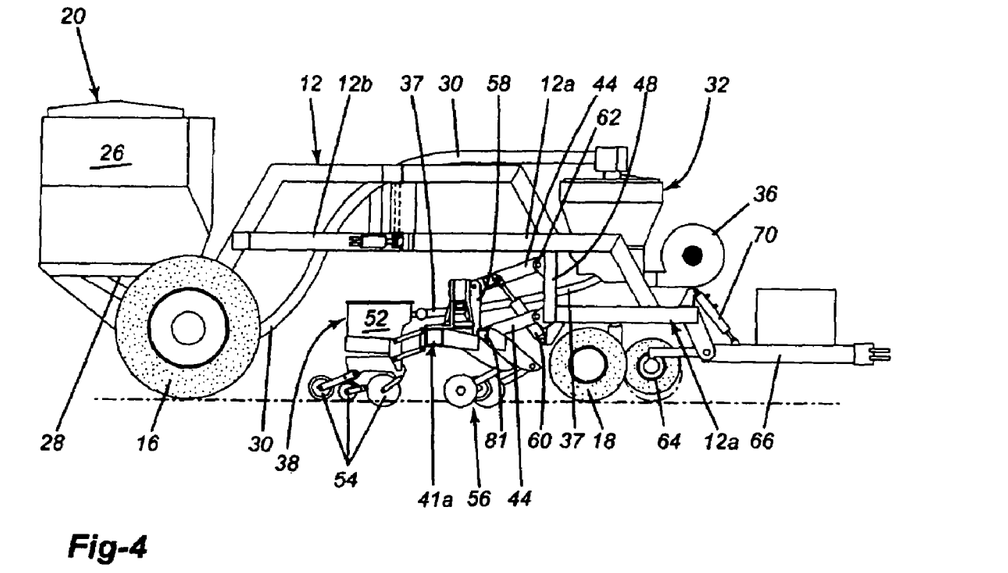
FIGS. 4 to 6 are side elevational views of the seed and fertilizer drill of FIG. 1 in different operating positions.
Figure 5:
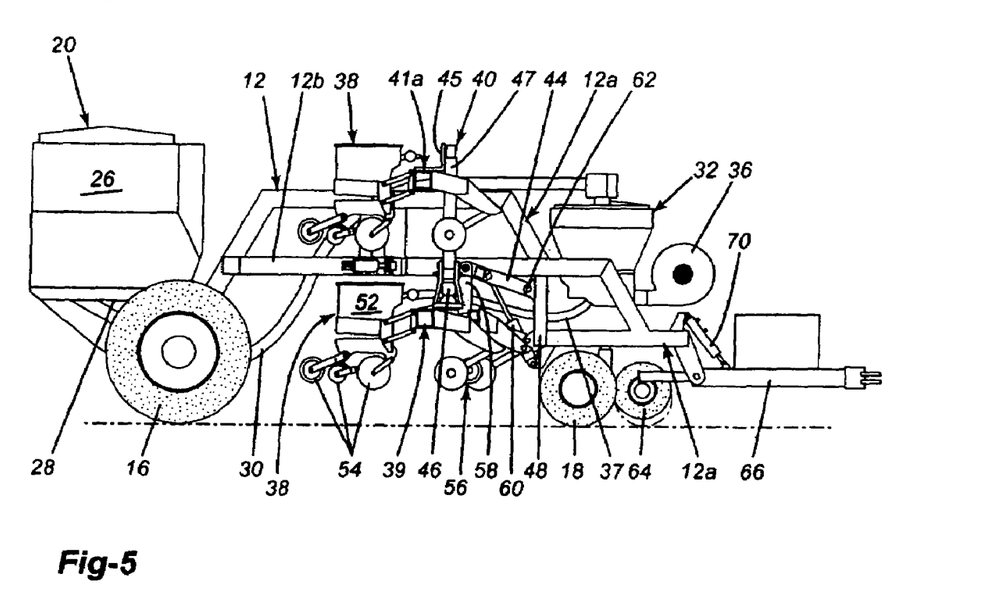
Figure 6:
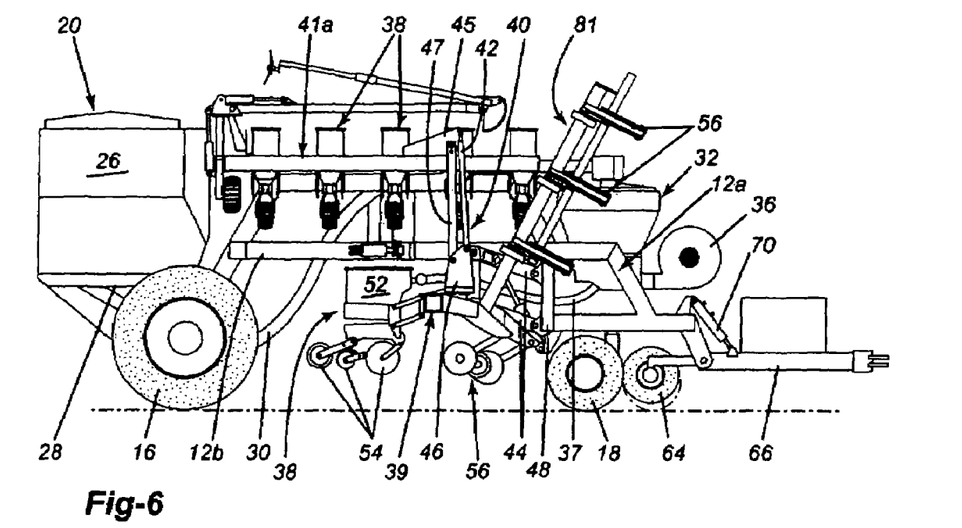

The planting units 38 are of a type commonly known in the art, for example a modal 1200 manufactured by Case. As shown in FIGS. 4 to 6, each planting unit 38 typically comprises a seed hopper 52 and wheels 54 for opening and closing furrows as well as for calibrating, such that each planting unit 38 opens a furrow, distributes seeds from the seed hopper in the furrow and closes the furrow over the distributed seeds. When the main reservoir 20, and subsequently the secondary reservoir 32a, is filled with seeds, the flexible plastic tubes 37 are placed so as to deliver the seeds from the secondary reservoir 32a to the seed hoppers 52 of the planting units 38. The planting units then deliver the seeds to the ground in the standard manner. When the reservoirs 20, and subsequently the secondary reservoir 32b, are filled with granular fertilizer, flexible plastic tubes (not shown) are placed to discharge the fertilizer ahead of the seed distribution in separate furrows created by a set of removable wheels 56.

As indicated in FIGS. 4 and 5, the primary transverse member 39 is fixedly linked to a support member 58, which is fixed to a pair of hydraulic actuators 60 and are attached to the support frame 12a and the support member 48, and actuators 60 are also pivotally attached to a quadrilateral linkage made up of two pairs of parallel members 44 through pivot joints 62 on vertical posts 48 integral with the support frame 12a.

The primary transverse member 39 preferably has a width similar or close to a distance defined between the outmost rear wheels 16.

Figure 12:
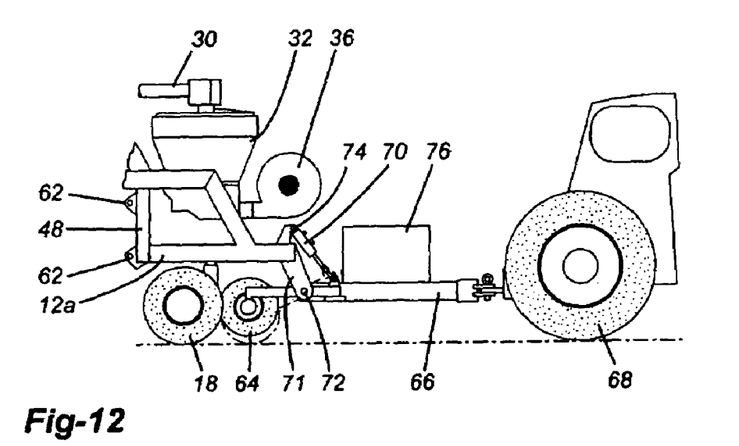
FIG. 12 is a schematic, fragmentary side elevational view showing a further detail of the seed and fertilizer drill.

Referring now to FIGS. 1 and 12, a hitch pole 66 is shown adapted to be connected to a tractor 68. The hitch pole is pivotally mounted about a horizontal axis on pivot shaft 72 mounted in pivot bracket 71 which is in turn fixed to the forward frame 12a. A hydraulic actuator 70 is pivotally connected to a pivot bracket 74 on the frame 12a; the other end of the actuator 70 is pivoted to the hitch pole 66. The auxiliary wheel 64 may also be connected to the hitch pole 66 but rearwardly of the pivot shaft 72. When the seeding and fertilizer drill 10 is not connected to a tractor, or in the event the tractor is in a transport mode, pressure in the actuator 70 will be released that would allow the auxiliary wheel 64 to engage the ground to help support the weight of the drill 10 along with wheels 18. However when the seeding and fertilizer drill 10 is being utilized in the field and the planting units are deployed, it is preferable to provide better traction to the tractor, in which case hydraulic pressure is directed to the actuator 70 while the hitch pole 66 is connected to the tractor 68. The extension of actuator 70 has the effect of lifting the forward frame 12a slightly, thereby increasing the angle between the pivot bracket 71 and the hitch pole 66 which causes the weight to be transferred onto the hitch pole 66, and thus the tractor 68. Normally the wheel 64 is utilized solely for metering the distribution of the seed or fertilizer granules.

Figure 7:
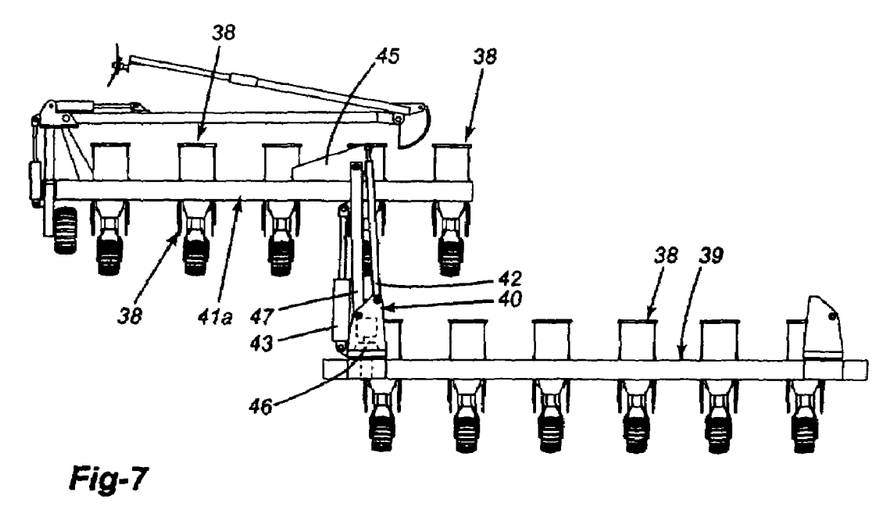
FIG. 7 is a fragmentary front elevation of a detail of the drill.

As shown in FIGS. 5 to 7, each outer transverse member 41a,b is associated to the primary transverse member 39 by means of a lift system 40. Each lift system 40 comprises a bracket 45, a pivot bracket 46, an actuator 43, and two elongated link members 42,47. The bracket 45 is fixed to the outer transverse member 41a. The pivot bracket 46 is rotationally mounted to one end of the primary transverse member 39. Both elongated link members 42,47 are pivotally connected to the bracket 45 at one end and to the pivot bracket 46 at the other end, the link member 47 being the shorter link compared to the member 42. Finally, the actuator 43 is pivotally attached to the pivot bracket 46 at one end and to the member 47 at the other end.

As shown in FIG. 6 the wheels 56 may be independently mounted on an arm 81. As shown in FIG. 4, the arm 81 would normally be parallel and forward of the outer transverse member 41a. However when the drill 10 is being prepared for transport, the arm 81 will be retracted against the frame 12a as shown in FIG. 6 by a conventional actuator (not shown).

Figure 8:
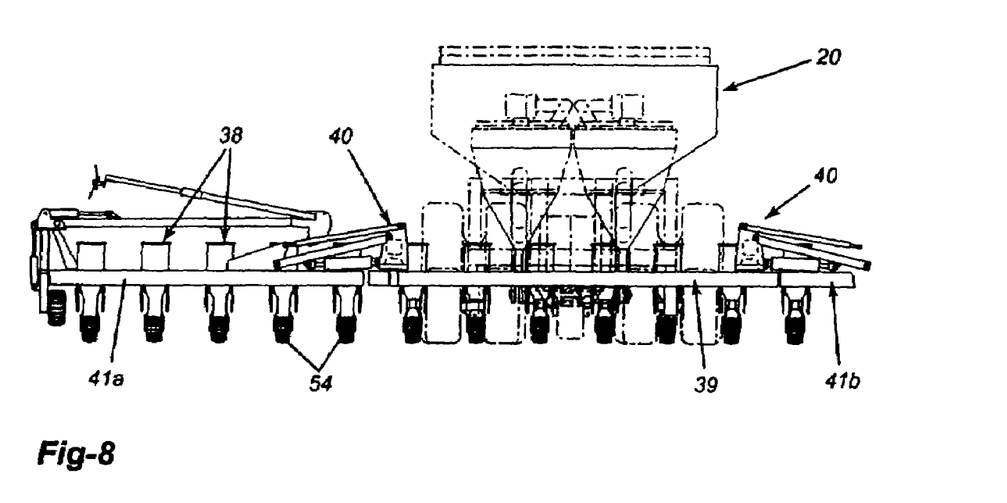
FIGS. 8 to 10 are fragmentary front elevational views showing different operative positions of the seed and fertilizer drill.
Figure 9:
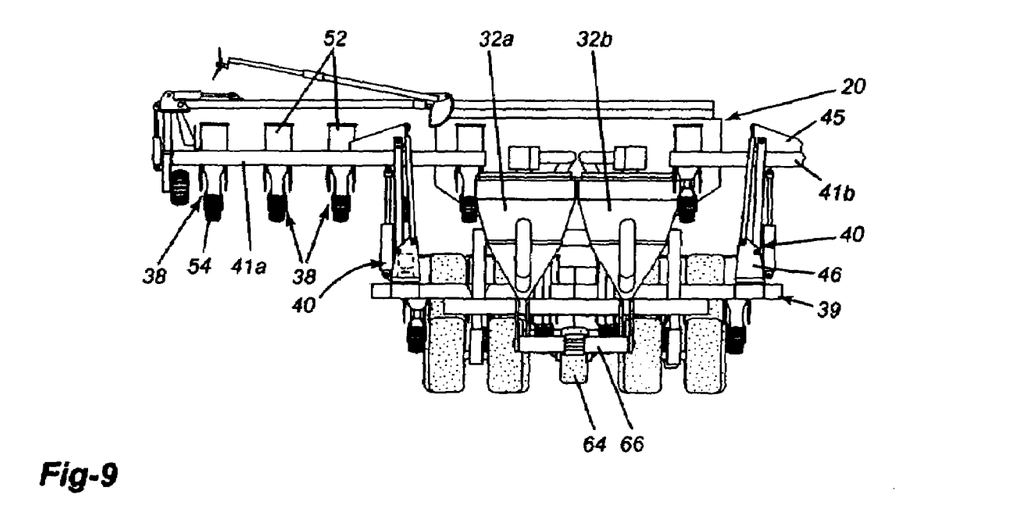
Figure 10:
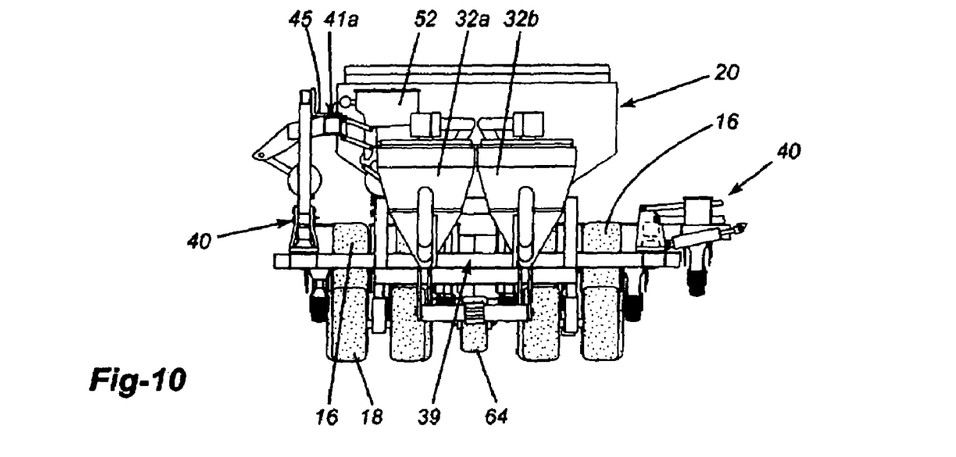
Figure 11:
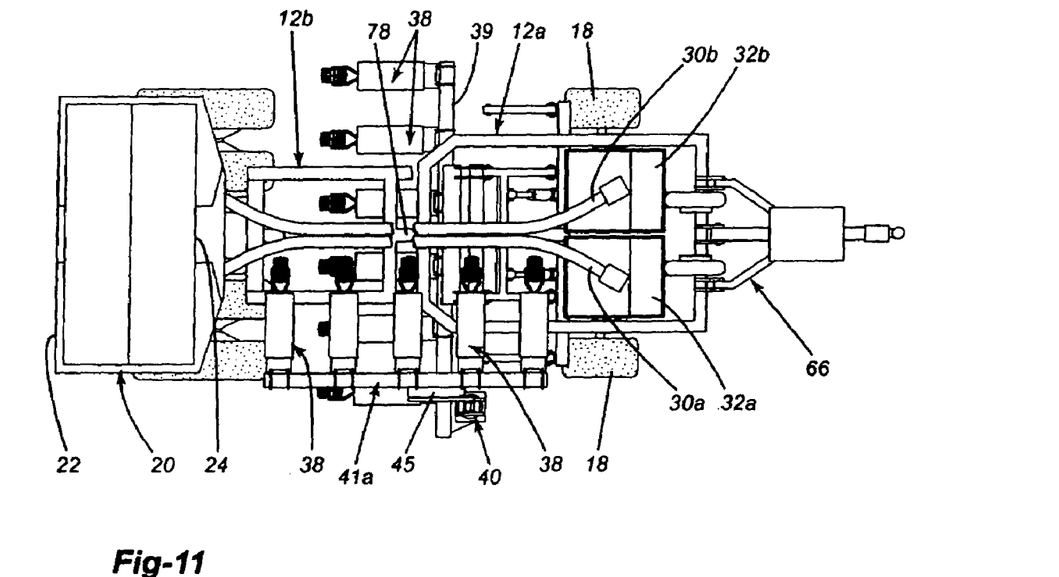
FIG. 11 is a top plan view of the seed and fertilizer drill in the operative is position shown in FIG. 9.

When the drill 10 is in operation, the transverse members 39,41a,b are deployed as shown in FIGS. 2, 3 and 8, with the wheels 54 of the planting units 38 in contact with the ground. However, when the drill 10 needs to execute a sharp turn, the primary and outer transverse members 39,41a,b are elevated together through the actuators 60 and the quadrilateral linkage 44. The lift systems 40 provides a rigid connection between the primary and outer transverse members 39,41a,b. This action removes the contact of the wheels 54 of the planting units 38 from the ground, thereby reducing the width of ground contact of the drill 10 and allowing a smaller radius of turn.

It is also noted that the frame 12 is hinged at the very center thereof to provide a vertical pivot axis at 78. The frame members 12a and 12b are also provided with abutments to permit 5° of rotation between the frame members 12a and 12b. For the purposes of transport, locking mechanisms 80 are provided to lock the frame members 12a and 12b into a single rigid unit.

When it is necessary to transport the drill 10 on a public road, or to have a reduced width for any other reason, the primary and secondary transverse members 39,41a,b are first elevated as just described, to eliminate contact between the wheels 54 of the planting units 38 and the ground. Then, each outer transverse member 41a and 41b is elevated above the primary transverse member 39 while remaining horizontal so as not to spill the seeds contained in the seed hoppers 52, as shown in FIGS. 5-10 The elevation of each outer transverse member 41 is produced through the extension of the actuator 43. When the outer transverse member 41a for instance is at maximum height, it is rotated rearwards through a 90° rotation of the pivot bracket 46. This allows for the planting units 38 to be contained within the width of the primary transverse member 39, thereby minimizing the effective width of the drill 10.

Figure 14:
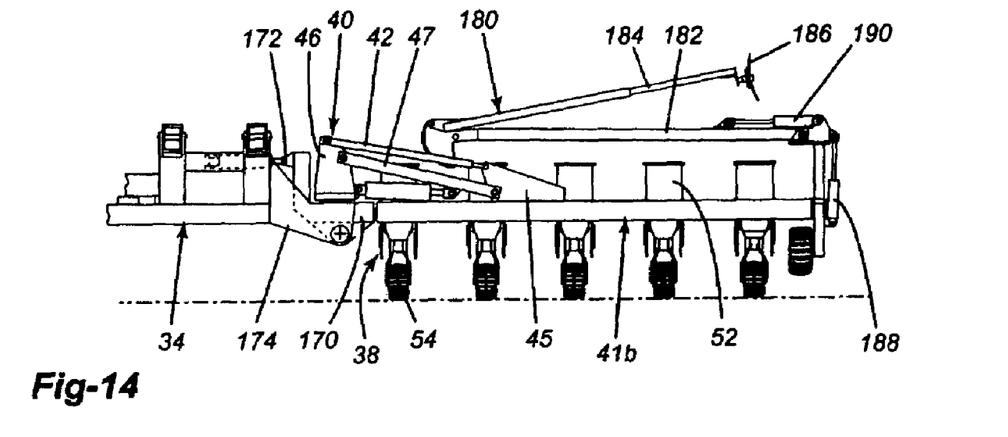
FIG. 14 is a fragmentary front elevational view of a further embodiment of the seed and fertilizer drill.
Figure 15:
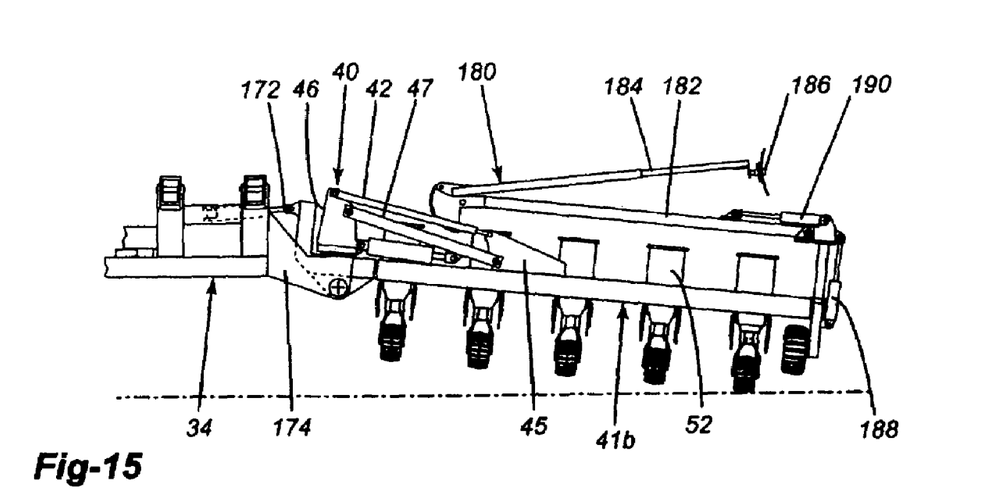
FIG. 15 is a fragmentary front elevational view similar to FIG. 14 showing the detail in a different operative position.

The pivot bracket 46 may be mounted to a separate platform 170 which is pivotally mounted on the primary transverse member 39, as shown in FIGS. 14 and 15. The platform 170 is thus connected to the secondary transverse member 41b through the lift system 40. In addition, the platform 170 is connected to a secondary actuator 172 which is attached to a support structure 174 with a slight downward angle. The support structure 174 is in turn connected to the primary transverse member 39. Thus, the platform 170 together with the lift system 40 and secondary actuator 172 provides a link between the primary and secondary transverse members 39,141b.

When the drill 10 is in operation, the transverse members 39,41a,b are disposed as shown in FIGS. 14 and 15, with the outer transverse member 41b having a slight downward angle with respect to the primary transverse member 39. This angle is provided by the secondary actuator 172 which is extended to provide constant pressure forcing all the planting units 38 of the outer transverse member 41b to stay in contact with the ground. Such pressure compensates for unevenness of the ground, which could otherwise cause the outermost planting units to be lifted out of contact with the ground.

When the primary and secondary transverse members 39,41a,b are elevated together through the actuators 60, to execute a sharp turn as described above, the secondary actuators 172 are completely retracted (not shown). This has the effect of tilting the secondary transverse members 41a,b with an angle of approximately 5 degrees so that the outer ends thereof are slightly higher than the end in proximity to the primary transverse member 39. The outermost planting units will therefore be more elevated, providing for an easier turn with a reduced risk of contacting uneven ground which would increase the width of ground contact of the drill 10 and the radius of turn.

A further feature is also being contemplated as shown in FIGS. 1 to 3, 14, and 15, for example. This feature includes a guide member 180 mounted to the end of the respective outer transverse members 41a,b. The guide member 180 has a pair of articulated arms 182 and 184 and a disc 186 at the end of arm 184. A pair of hydraulic actuators 188 and 190 along with a cable 192 service to retract or deploy the guide member 180. When the drill 10 is in operation, the guide member 180 is deployed so that the disc 186 may follow in a previously plowed furrow in order to allow for a constant distance between furrows.

The present invention presents several advantages. First, the location of the planting units in front of the rear wheels allows for a better weight distribution when the planting units are elevated. The weight of the elevated planting units is distributed on all wheels as well as on the hitch in a downward direction. Better traction of tractor wheels is provided by avoiding the upward force seen in the prior art that tended to lift the tractor.

Also, the folding secondary transverse members allow the drill to safely travel on public roads by reducing the width of the drill to a width comparable to that of a tractor. The width of the drill can be reduced without compromising an operational width, when the planting units are deployed in the operation position. The drill can therefore, for example, accommodate eleven (11) metric tonnes of granular fertilizer, have sixteen (16) or even thirty-one (31) planting units, and have a travel width of less than fifteen (15) feet.

Finally, use of a secondary reservoir connected to the main reservoir through a conveyor allows for placement of the main reservoir very low to the ground. Many prior drills use either a pneumatic or gravity-driven distribution system directly from the main reservoir, requiring elevation of the main reservoir in order to provide the necessary downward path for the seeds or fertilizer for a correct functioning of the distribution system. The conveyor allows for an upward path of the seeds or fertilizer, thereby allowing placement of the main reservoir as low as possible, the height of the reservoir being only limited by ground interference. Thus, the loading of the main reservoir through the open top is easier while the lower weight distribution improves a stability of the drill.

The embodiments of the invention described above are intended to be exemplary. Those skilled in the art will therefore appreciate that the forgoing description is illustrative only, and that various alternatives and modifications can be devised without departing from the spirit of the present invention. Such alternatives include, for example, providing a separation in the reservoirs 20,32 to obtain two sub-reservoirs in each, with a conveyor 30 extending from each of the two main sub-reservoirs to the respective secondary sub-reservoir, in order to be able to use the distribution system both for seed and granular fertilizers at the same time. Accordingly, the present invention is intended to embrace all such alternatives, modifications and variances which fall within the scope of the appended claims.

What is claimed is:

1. A drill adapted to distribute at least one of seeds and solid fertilizer, the drill comprising:
    a support frame supported by at least two rear wheels aft thereof;
    a main reservoir installed on a rear portion of the support frame, the main reservoir forming a receptacle with an at least partially open top to receive the at least one of the seeds and the solid fertilizer, the main reservoir having an outlet in a lower portion thereof;
    a secondary reservoir installed on a front portion of the support frame;
    a distribution system in communication with the secondary reservoir for distributing the at least one of the seeds and fertilizer; and
    a conveyor in communication with the outlet in the main reservoir and extending to the secondary reservoir such as to carry the at least one of the seeds and the solid fertilizer from the main reservoir to the secondary reservoir;
    whereby the at least one of the seeds and solid fertilizer travels from the main reservoir to the secondary reservoir via the conveyor, and is distributed from the secondary reservoir through the distribution system.

2. The drill according to claim 1, wherein the main reservoir is installed substantially above the rear wheels.

3. The drill according to claim 1, wherein the distribution system includes a blower connected to flexible tubes, the blower providing a pressure force pushing the at least one of the seeds and solid fertilizer from the secondary reservoir through the flexible tubes.

4. The drill according to claim 1, wherein the main reservoir carries solid fertilizer only and the distribution system distributes the solid fertilizer from the secondary reservoir to the ground.

5. The drill according to claim 1, wherein the main frame also supports a plurality of planter row units extending in a generally regularly spaced apart manner in a direction generally perpendicular to a direction of travel of the drill, each of the planter row units being adapted to open at least one furrow, deposit seeds in the furrow, and close the furrow over the deposited seeds.

6. The drill according to claim 5, wherein the planter row units each comprise a seed hopper, the distribution system distributing the seeds from the secondary reservoir to the seed hoppers.

7. The drill according to claim 5, wherein the planter row units are supported on the main frame in front of the rear wheels through a lift system so that the planter row units can be lifted above ground when not in use.

8. The drill according to claim 7, wherein the lift system also allows outer planter row units to be lifted above inner planter row units such that the outer and inner planter row units are generally vertically aligned.

9. The drill according to claim 8, wherein the lift system further allows the outer planter row units above the inner planter row units to be pivoted so as to reduce an effective width of the drill.

10. The drill according to claim 1, wherein there are dual main reservoirs and secondary reservoirs and a dual conveyor system for moving the seeds and the fertilizer separately of the seeds, and separate distribution systems are provided for the seeds and the fertilizer, respectively.

11. The drill according to claim 1, wherein the conveyor comprises a flexible endless screw and an elongated tube, the endless screw turning inside the elongated tube so as to carry the at least one of the seeds and solid fertilizer through the tube.

12. The drill according to claim 1, wherein the solid fertilizer is granular.

13. The drill according to claim 1, wherein the support frame includes a forward sub-frame and a rearward sub-frame hinged together about a vertical axis to provide the support frame with a limited degree of articulation to provide improved arcuate tracking of the drill.

14. The drill as defined in claim 13, wherein the limited articulation is limited to 5°.

15. The drill as defined in claim 13, wherein locking means are provided to lock the sub-frame into a rigid member for transport.

16. A method for distributing at least one of seeds and granular fertilizer, the method comprising the steps of:
    providing a seed and fertilizer drill having a main reservoir located near a rear end thereof, a secondary reservoir smaller than the main reservoir and located near a front end of the drill, a conveyor adapted to transport the at least one of seeds and granular fertilizer from the main reservoir to the secondary reservoir, and a distribution system adapted to distribute the at least one of seeds and granular fertilizer from the secondary reservoir;
    filling the main reservoir with the at least one of seeds and granular fertilizer;
    transporting the at least one of seeds and granular fertilizers from the main reservoir to the secondary reservoir through the conveyor; and
    distributing the at least one of seeds and granular fertilizers from the secondary reservoir with the distribution system.

17. A method according to claim 16, wherein the main reservoir is filled only with granular fertilizer and the granular fertilizer is distributed by the distribution system from the secondary reservoir to the ground.

18. A method according to claim 16, further comprising a step of providing a plurality of planter row units extending in a generally spaced apart manner, each being adapted to open a furrow, deposit seeds from a seed hopper within the furrow, and close the furrow over the deposited seeds, and wherein the main reservoir is filled only with seeds and the seeds are distributed by the distribution system from the secondary reservoir to each seed hopper.

* * * * *